United States Patent Office.

ERASTUS W. AYER AND MELVILLE C. AYER, OF SOUTH WATERFORD, MAINE.

Letters Patent No. 94,375, dated August 31, 1869.

IMPROVED ARTICLE OF FOOD FROM PUMPKINS AND SQUASHES.

The Schedule referred to in these Letters Patent and making part of the same.

*To all whom it may concern:*

Be it known that we, ERASTUS W. AYER and MELVILLE C. AYER, of South Waterford, in the county of Oxford, and State of Maine, have invented a new and valuable Improvement in Prepared Pumpkin and Squash; and do hereby declare that the following is a full, clear, and exact description of the same.

Our invention has relation to new articles of food; and it consists mainly in a novel preparation of vegetable called pumpkin, by which said vegetable may be preserved for a great length of time in a condition suitable for use in making pies or puddings.

To make our prepared pumpkin, we first cut said vegetable into small slices, and dry them thoroughly, either by solar or artificial heat. We then grind or otherwise pulverize the desiccated pumpkin into fine powder, when it assumes the external appearance of corn-meal, ground to the ordinary fineness. When thus prepared, we place the meal or powder in suitable boxes for family-use.

The process above described is applicable to the preparation of the vegetable called squash, as well as pumpkin, and meal or powder prepared thus from squash is found to be highly nutritious, as well as palatable.

In using our prepared pumpkin or squash, we mix one table-spoonful thereof with one pint of milk, then add one egg, and a proper quantity of sugar, and the mixture forms the proper quantity for one pie. For puddings, the same materials are combined, and in the same proportions.

What we claim as our invention, and desire to secure by Letters Patent, is—

1. The process herein described for preparing pumpkin and squash, as new articles of food, substantially as specified.

2. Pumpkin, prepared as herein specified, as a new article of food, substantially as described.

In testimony that we claim the above, we have hereunto subscribed our names, in the presence of two witnesses.

ERASTUS W. AYER.
MELVILLE C. AYER.

Witnesses:
ZEBEDEE PERRY,
S. LIZZIE AYER.